United States Patent [19]

Ohsol

[11] Patent Number: 4,938,876
[45] Date of Patent: Jul. 3, 1990

[54] METHOD FOR SEPARATING OIL AND WATER EMULSIONS

[76] Inventor: Ernest O. Ohsol, 711 Hyannis Port North, Crosby, Tex. 77532

[21] Appl. No.: 318,176

[22] Filed: Mar. 2, 1989

[51] Int. Cl.⁵ .............................................. B01D 17/04
[52] U.S. Cl. ..................... 210/708; 210/712; 210/723; 210/728; 210/734; 210/737; 210/738; 210/177; 210/178; 210/182; 210/195.1; 210/202
[58] Field of Search ............... 210/708, 723, 737, 766, 210/734, 178, 912, 175, 712, 728, 774, 737, 787, 181, 182, 195.1, 512.1, 202, 738, 747, 177, 199; 208/188, 252, 282

[56] References Cited

U.S. PATENT DOCUMENTS

| | | | |
|---|---|---|---|
| 1,802,090 | 4/1931 | Roberts | 210/708 |
| 2,037,218 | 4/1936 | Empson | 210/708 |
| 2,327,302 | 8/1943 | Dittmar et al. | 252/132 |
| 2,533,166 | 12/1950 | Jones | 260/89.7 |
| 3,025,236 | 3/1962 | Barrett et al. | 252/8.5 |
| 3,090,759 | 5/1963 | Jenkins | 252/344 |
| 3,418,237 | 12/1968 | Booth et al. | 210/54 |
| 3,480,761 | 11/1969 | Kolodny et al. | 210/54 |
| 3,691,086 | 9/1972 | Less et al. | 252/329 |
| 3,707,464 | 12/1972 | Burns et al. | 210/44 |
| 3,716,480 | 2/1973 | Finley et al. | 210/22 |
| 3,737,037 | 6/1973 | Bone, III | 210/73 |
| 3,756,959 | 9/1973 | Vitalis et al. | 210/708 |
| 3,838,102 | 9/1974 | Bennett et al. | 260/47 ET |
| 3,951,917 | 4/1976 | Floryan et al. | 260/47 ET |
| 4,026,870 | 5/1977 | Floryan et al. | 260/47 ET |
| 4,097,458 | 6/1978 | Bennett et al. | 260/47 ET |
| 4,179,369 | 12/1979 | Bradley et al. | 210/43 |
| 4,350,596 | 9/1982 | Kennedy, Jr. | 210/708 |
| 4,396,504 | 8/1983 | Tannehill | 210/86 |
| 4,460,764 | 7/1984 | Reffert et al. | 528/487 |
| 4,507,208 | 3/1985 | Simon et al. | 210/721 |
| 4,519,899 | 5/1985 | Oertle et al. | 210/723 |
| 4,536,294 | 8/1985 | Gullett et al. | 210/730 |
| 4,599,117 | 7/1986 | Luxenburg | 134/25.1 |
| 4,778,590 | 10/1988 | Reynolds et al. | 208/252 |
| 4,789,461 | 12/1988 | Clare et al. | 208/187 |
| 4,812,225 | 3/1989 | Corti et al. | 210/708 |

FOREIGN PATENT DOCUMENTS

| | | | |
|---|---|---|---|
| 131243 | 1/1985 | European Pat. Off. | |
| 2729607 | 1/1979 | Fed. Rep. of Germany | 210/178 |
| 53-2383 | 1/1978 | Japan | 210/708 |
| 1049435 | 6/1982 | U.S.S.R. | 210/177 |
| 1222698 | 2/1971 | United Kingdom | 210/177 |
| 1329174 | 4/1971 | United Kingdom | |

Primary Examiner—Peter Hruskoci
Assistant Examiner—Krisanne Shideler
Attorney, Agent, or Firm—Spencer & Frank

[57] ABSTRACT

The present invention provides a process and apparatus for separating oil water and solids from emulsions. More particularly, the present invention provides a process and apparatus for continuously separating oil, water and solids from stable mixtures thereof, comprising heating the mixture to at least about 115° C., rapidly cooling the mixture to below 100° C., separating the solids from the liquids and separating the water from the oil. Preferably, the invention also includes the step of adding a flocculant prior to cooling the mixture.

41 Claims, 1 Drawing Sheet

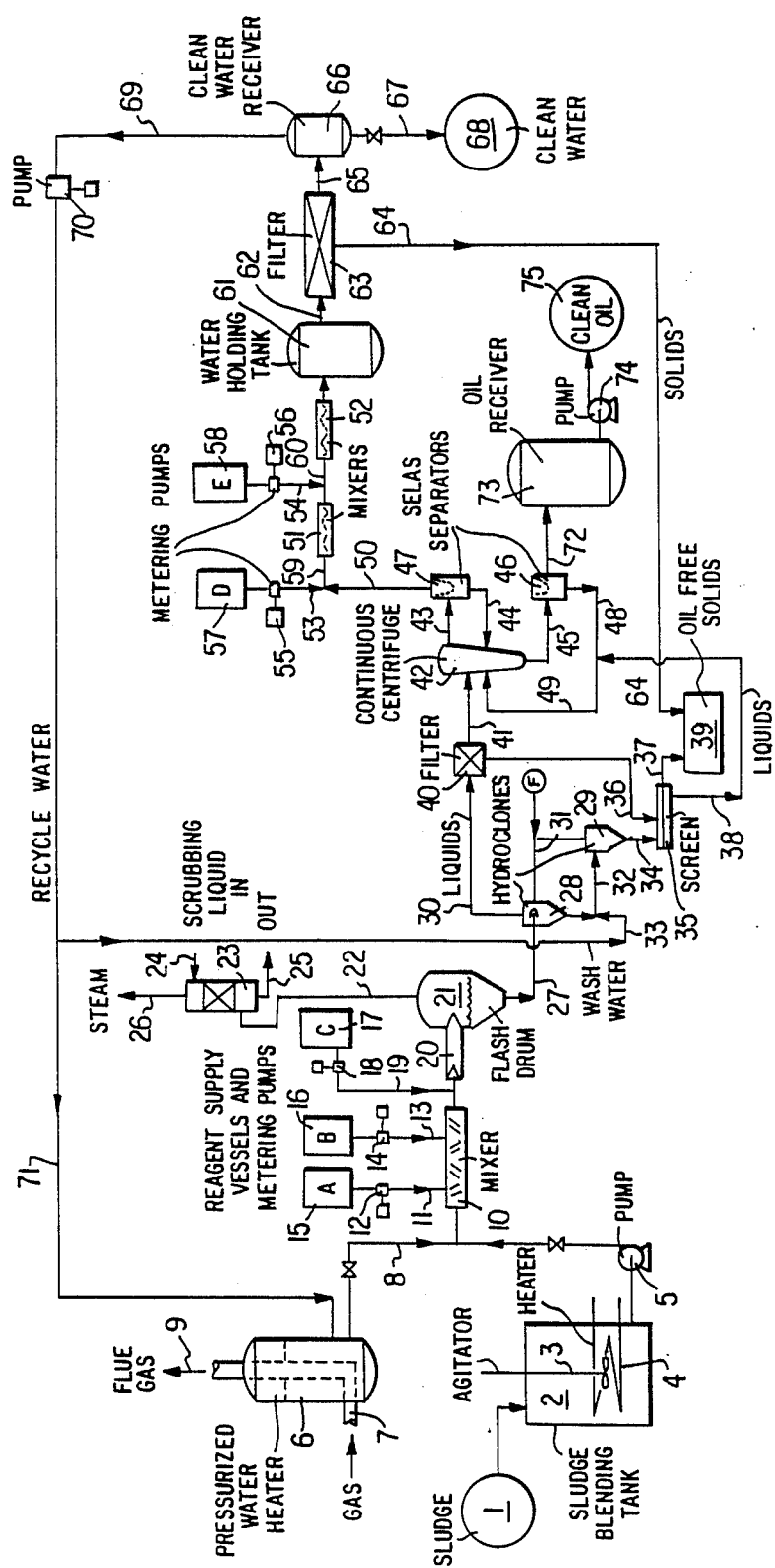

METHOD FOR SEPARATING OIL AND WATER EMULSIONS

BACKGROUND OF THE INVENTION

The invention relates to the purification and separation of oil, water and solids from waste oil. This waste oil can be found in many forms and is particularly found in large quantities as storage tank bottoms and in lagoons where waste oil has historically been transferred for storage. Crude oil contains varying, but in some cases high, percentages of B.S. and W., i.e., bottom sediment and water, plus paraffin and other materials. These contaminates adhere to the sides and build up on the bottom of crude oil storage tanks, forming a thick, viscous slurry referred to as waste tank bottom sludge or bottom settlings and water. This build-up of water, paraffin, sand, clay, and other materials is generally rich in hydrocarbon content, but unsuitable for refining. These circumstances result in reduced storage capacity for the crude oil tanks and many millions of barrels of nonuseable crude product.

Among other things, tank bottom sludge is characterized by high concentrations of inorganic contaminants, e.g., inorganic salts and heavy metals (sodium, calcium, vanadium, nickel, chromium, etc.). These affect the expensive catalysts used in the refining process making such waste oil unsuitable for refining even after it has been separated from any water and solids.

Much of the mineral oil (petroleum) which is produced in various countries of the world contains at least some water and at least some finely divided solid components. If the oil itself as extracted from the earth as a crude does not have such solids and water present, then scales, salts and dirts from oil well field equipment, pipelines, tankers, tanks and other sources introduce water and solids into the oil. In conventional processes for breaking petroleum emulsions the mineral oil is separated for use in refineries and the water is separated for reuse or disposal. There is a tendency, however, for the more difficult to break portions to be concentrated without separation. In the past, the discard streams from refineries which contain the more difficult to treat suspension-emulsion fractions and tank bottom sediments have been collected and trucked to disposal lagoons or other locations where the material could be discarded. This is an economic waste and an ecological disaster. A major refinery may have tens of thousands of pounds per day of such emulsion-suspensions which because of new environmental regulations are now not acceptable for solid waste disposal and which are not acceptably left in waste lagoons where the mixture would represent a long-term environmental hazard.

BACKGROUND ART

The prior art on petroleum treating is voluminous. The crudes from various oil fields differ in composition, and requirements for treatment. This is compounded by the wide variety of exposure, storage and shipping conditions to which mineral oils are subjected.

The literature, both patent and other publications, discloses surfactants, flocculants, and various processes.

As the volume of mineral oil products to be treated has increased, the pollution standards have become more strict and the systems for recovery more varied and complex. Many different inconsistent recommendations on the use of polymers and demulsifiers appear throughout the literature.

U.S. Pat. No. 2,327,302 to Tmar discloses the use of a precipitate-inhibiting amount of an alkali metal salt of a halogen-substituted polyacrylic acid as a hard water softening agent or for redissolving precipitates already formed and mentions use for dyeing, water softening or boiler feed water.

U.S. Pat. No. 2,533,166 to Jones discloses a method of producing polyacrylamides having a high peptizing action to prevent the sedimentation of finely divided materials such as pigments and silver halide dispersed in aqueous media.

U.S. Pat. No. 3,025,236 to Barrett et al. shows the sodium salt of sulfonated dodecyl diphenyl oxide and an acrylamide polymer as a flocculating agent.

U.S. Pat. No. 3,090,759 to Jenkins discloses the use of a homopolymerized acrylamide and certain related copolymers having a molecular weight of at least 40,000 and preferably up to one million for use in breaking oil-in-water emulsions. Also disclosed is the use of these polyacrylamides admixed with compatible oil and water demulsifiers (column 6, lines 55 to 60). The proportions from 1 p.p.m. to about 500 p.p.m. of the volume of the emulsion treated are recommended.

U.S. Pat. No. 3,480,761 to Kolodny et al. shows a very high molecular weight polyacrylamide with a very low degree of hydrolysis in the flocculation and coagulation (polymerization) of solids from an aqueous system.

U.S. Pat. No. 4,519,899 to Oertle et al. describes a process and apparatus for the purification of oil using a jet pump mixer at elevated temperature. The jet pump was used as a mixing device in conjunction with a static mixer.

U.S. Pat. No. 4,460,764 to Reffert et al. describes a method for catalyst removal using complex-forming or chelateforming compounds in the presence of an anionic or non-ionic surfactant in an aqueous medium.

The entire disclosures of the above-identified patents are hereby incorporated by reference and relied upon.

SUMMARY OF THE INVENTION

The present invention provides a process and apparatus for separating oil, water and solids from emulsions. More particularly, the present invention provides a process and apparatus for continuously separating oil, water and solids from stable mixtures thereof, comprising heating the mixture to at least about 115° C., rapidly cooling the mixture to below about 100° C., separating the solids from the liquids and separating the water from the oil. Preferably, the invention also includes the step of adding a flocculant prior to cooling the mixture.

The invention deals with mineral oil emulsions stabilized by finely divided solid materials to be separated into an economically processable mineral oil fraction which is low in both suspended solids, water, heavy metals and other contaminants, an ecologically acceptable waste water, and, preferably, flocculated finely divided clean oil-free solids which can easily be disposed of.

An important feature of the invention is an unusually high temperature treatment of the sludge with suitable agents to remove the encapsulating solids from the dispersed liquid phase. This treatment is then followed by more conventional separation procedures.

BRIEF DESCRIPTION OF THE DRAWING

The drawing FIGURE illustrates an embodiment of the invention in schematic form. It particularly shows the step of heating the mixture using superheated water and/or steam, followed by cooling the mixture by flashing it to lower pressure and separating the components of the mixture by centrifugally enhanced separation steps.

DETAILED DESCRIPTION OF THE INVENTION

Preferably the emulsions to be treated are mixed with an effective amount of a surfactant or surfactants which acts as a demulsifying agent. Then, the emulsions are pressurized to an absolute pressure between 1.7 and 8 atm and mixed with a sufficient quantity of superheated water and/or steam (liquid water above its normal boiling point) or superheated steam to raise the temperature of the mixture to at least about 115° C., preferably higher.

The addition of the superheated water and/or steam to the pressurized oil mixture causes a dramatic decrease in viscosity and surface tension, aided and abetted by the presence of the surfactants which may be added before or after the hot water. The components are well mixed, as for example by use of an interrupted-helix static mixer, or an in-line stirred tank.

After the high pressure, high temperature blending step has been effected, a suitable amount of a flocculating agent is preferably added to the mixture, using an injecting means and a low-residence time mixing device such as the static mixer mentioned above. The use of a flocculant is particularly desirable for those emulsions in which the solids do not melt or decompose due to the increase in temperature and pressure. However, in some situations, a flocculant may be not be necessary. For example, in some emulsions, the suspended solids are particles of hydrocarbon waxes which liquify when the temperature and pressure of the mixture is increased, so that the problem of suspended solids is eliminated without using a flocculant.

When flocculants are used, they preferably are high molecular weight polymers which are unstable at high temperatures. Therefore, means are provided for quickly contacting the sensitive flocculant with the oil-water-solids system to be treated. After a residence time of as much as 5 minutes, but preferably less than 1 minute, the temperature of the system is rapidly dropped, in as little as 1 to 2 seconds, so as to prevent substantial deterioration of the flocculant. The rapid cooling can be accomplished by suddenly releasing the pressure of the fluid, for example, by passing it through a Venturi expansion jet, or by quickly adding a substantial amount of cold water and blending it with the fluid.

For a very rapid flocculant addition plus cooling system, the flocculant may be added at the throat of the Venturi expander.

Once the oil-water-solids system plus flocculant has been expanded and chilled to below 100° C., preferably below 90° C., the solids may be expeditiously removed utilizing conventional means such as cyclone or hydrocyclone separators, screens, impingement devices, etc. The expansion method for achieving the rapid cooling has the additional benefit of helping to rupture the micro-structure of solids protecting the oil-water interfaces, which has inhibited normal oil-water separation by settling/coagulation of droplets.

Once the solids are removed, the oil-water dispersion can much more easily be separated by conventional means such as settling, centrifuging, passage through semi-permeable membranes, etc.

The present process is particularly useful in conjunction with such waste mixtures as have been previously considered completely untreatable but is also useful for more economically treating suspension-emulsions which have been more or less tractable to treatment by conventional methods.

The waste may contain from very thin mineral oil fractions, almost in the gasoline range, down to heavy residual oils which must be heated to be flowable. The solids suspended in the material are usually finely divided materials, which can include salts which are soluble in water, such as sodium chloride, but are in larger quantity than is soluble in the water present. The suspended solids may also include insoluble salts such as calcium carbonate, ferric phosphate, hydroxides, such as ferric hydroxide, aluminum hydroxide, silicates, phosphates, e.g., calcium and magnesium phosphates, clays, soot, carbon and plain "dirt" which is practically anything organic or inorganic in finely divided form. The finely divided particles may range from smaller colloidal sizes of the order of 0.1 microns up to and including particles which are large enough to settle when standing by gravity.

Particles which freely settle on standing by gravity may be settled out and discarded prior to the further treatment processes of the invention.

The nature of the emulsion-suspension is heterogeneous at best. The emulsion may be of a water-in-oil or oil-in-water, or a mixture of both, and the insoluble solid particles can be suspended in either the oil phase, the water phase or the interface between the phases. Finely divided solid particles in themselves may act as emulsifying agents under some conditions. The emulsion-suspension mixture may have various types of naturally occurring emulsifying or suspending agents present.

In the present invention, the surfactants aid in breaking the water-in-oil and oil-in-water emulsions causing the separate coalescence of each of the oil and water particles. A polyelectrolyte aids in the flocculation and separation of the finely divided solids from both the oil and water phases, as well as the interfaces. As mentioned above, the oil-water separation is greatly facilitated by first removing the fine solids.

Because the emulsion suspension being fed into the system is often primarily a mixture of waste streams from various sources, the composition may vary widely. Usually it contains at least about 20 percent mineral oil.

As used in the present application, the term mineral oil refers to a mineral oil of any type, including crude oil directly as recovered from a well, or any of the streams in a petroleum refinery which may contain from almost gasoline type components down through residual still bottoms.

The emulsion suspension from such a source usually contains at least about 5 percent water. However, the composition may contain up to about 80 percent of water. The water may be from almost a salt-free water to one which is essentially salt saturated. Under many conditions, the water results from the influx of sea water or is a residual water layer in which some sea water salts and other salts have been dissolved so that the aqueous phase may be nearly saturated in sea water salts as well as many other components. Water may have been evaporated off, which increases the salts concentrations. The oil may be from a water flooding petroleum recovery operation of an oil field.

Frequently, incoming mineral oil is run through distillation processes to separate out desirable fractions which may be fed to thermal or catalytic crackers, or other refinery processes, with the salts and insolubles and residual water being concentrated in the rejected fractions so that the intractable fractions from all over a refinery may be fed to the present system for treatment. Because of the variegated source of solids, the solid materials may be only a fraction of 1 percent up to about 40 percent by weight or more especially if the waste has been stored in lagoons.

From this heterogeneous mixture, by the treatment of this invention, the waste oil can be converted into high quality oil which may be added to a refinery stream whose composition it most nearly resembles for distillation, cracking, hydrogenation, desulfurization, or other processing to obtain economically useful products including gasoline, lubricating oil, heating oil, residual fuel oil and the like. The water and solids are also recovered, in a form suitable for non-polluting disposal.

An embodiment of this invention is shown in the drawing figure and the numbers in this description refer to the numbers on the drawing FIGURE.

An oil refinery tank bottom sludge 1 of heavy consistency is fed by suitable means, such as a screw conveyor, into a sludge blending tank 2, which serves to blend the sludge and heat it to a pumpable consistency. An agitator 3 and a steam heating coil 4 serve this purpose. Blended and prewarmed sludge (at 50° to 80° C., for example) is pumped by high pressure sludge pump 5 toward a static mixer device 10. A "Kenics" mixer is such a device, embodying interrupted internal helical flights. The sludge entering the mixer is preferably at a pressure of at least 7 atmospheres gauge, 8 atmospheres absolute, and is joined by steam and/or hot water coming through line 8 from a water heater 6 at a corresponding pressure. The water will have been heated by gas combusted in burner 7, passing through suitable heat exchange surfaces in 6 and the flue gas then exiting through duct 9. The water temperature will correspond to its boiling point at the given pressure i.e., at 7 atmospheres gauge, approximately 170° C. The water and the sludge are thoroughly blended in mixer 10, and before exiting the mixer, suitable amounts of demulsifying or separating agents are continuously injected from vessels 15 and 16 via proportioning pumps 12 and 14 and lines 11 and 13. The amounts of these treating agents are small but carefully controlled, based on an analysis of the entering sludge—i.e., the water and solids content, the nature of the oil and of the solids. Treating agent A from vessel 15 may be a surfactant or surface tension lessening agent such as a polyethylene oxide-alkyl phenol condensation product, non-ionic in character, while treating agent B from vessel 16 may be flocculating agent such as a polyacrylamide or modified polyacrylamide or derivative thereof, cationic in character. The amounts used may, for example, be 0.005 weight percent to 0.05 weight percent based on the entering sludge. The amounts used will depend on the particular treating agent and the nature of the sludge, and may be as low as 0.0005 percent (5 parts per million) or as high as 0.10 percent (1000 parts per million). A third treating agent C may be added as the mixture is leaving the mixer and entering nozzle 20 where the pressure is substantially reduced. This third agent enters from vessel 17 via proportioning pump 18 and injection line 19. Agent C may be a complexing agent such as citric acid, glycolic acid or EDTA, the purpose of which is to sequester metal contaminants contained in the oil and bring them out into the water phase. Agent C will also be added in suitably small amounts in the range of 50 to 500 parts per million.

In some cases it may be preferable to inject Agent C at the place shown for Agent B, and Agent B at the place shown for Agent C—for example, if Agent B is very heat sensitive flocculating agent and if Agent C requires a longer contact time to be effective.

In any case, the now blended mixture of sludge, hot water and treating agents passes through a nozzle 20 which may be of the Venturi type, dropping the pressure to just a few or even less than one atmosphere gauge, e.g. 0.3 to 0.6, atmospheres gauge, and thereby allowing a portion of the contained water to flash into steam, and dropping the temperature to the corresponding boiling point of water (109 to 115° C.). The amount of water thus vaporized is surprisingly small, of the order of 1 to 8 percent of the contained liquid water, but is enough to multiply the volume of the fluid as it enters a flash drum 21 by many fold. The fluid enters the flash drum 21 tangentially at the upper third of the vessel to facilitate disengagement of vapors from the liquid-solid slurry. The vapors will be mainly steam, but also will include small amounts of volatile material vaporized from the sludge, which may include $H_2S$, mercaptans, COS, disulfides, and nitrogen compounds in addition to lowboiling hydrocarbons. Due to the unpleasant odor and possible toxicity of some of these volatile contaminants, there is provided a small scrubber 23 for the vapors leaving 21 through line 22. The scrubber may be a vertical drum with Raschig ring or Berle saddle packing fed with a suitable scrubbing liquid such as a 10 percent NaOH solution in water, through line 24 and issuing through line 25, to be circulated. Very little of the steam will condense into the scrubbing liquid, and non-toxic steam vapors will issue from the scrubber through line 26, suitable for heating purposes.

The solid-liquid mixture remaining after the flashing step issues through line 27 into a hydrocyclone 28. This is a small diameter cyclone type separator, the feed material entering tangentially near the top. Solids are separated due to the high speed rotation and consequent centrifugal force generated in the liquid, and leave at the conical bottom, while the remaining liquid exits from the center at the top. Solids separation is facilitated due to breakup of the occluding structures which occurs in the flashing step and due to the surface tension modifying effects of the agents added prior to flashing. The solids leaving hydrocyclone 28 are joined by a stream of recycled hot water from line 33 and pass via line 32 into a second hydrocyclone 29. The recycled hot water serves to rinse the separated solids free of oily material. If desired, additional detergent material F may be added with this rinse water, or a plurality of such hydrocyclones in series may be provided for a countercurrent solids washing system. In the drawing only one such wash hydrocyclone is shown. The washed solids separate and exit from 29 through line 34 and drop onto vibrating screen 35. The solids are shaken free of adhering liquid and exit at 37, dropping into a receiving vessel such as a "Dumpster" for easy disposal as non-polluting, oil-free solid material. To provide complete dryness of the solids, a stream of hot air or flue gas from the water heater may be blown across the vibrating screen.

The spent rinse water issuing from the top of hydrocyclone 29 via line 31 is recycled to the first hydrocyclone 28, optionally with the addition of the above-mentioned detergent at F.

The essentially solids-free liquids leaving the first hydrocyclone 28 via line 30 pass through guard filter 40 which may be a cartridge or Cuno type filter. Solids periodically removed from it are added to the solids entering the screen 35. The liquid stream leaving guard filter 40 is fed directly to a continuous centrifuge 42. This is an axial flow machine of high throughout capacity, developing a separation force over 1000 times gravity. Oil leaves the machine through line 45, passes through Selas separator 46 via line 72 to receiver 73. The Selas separator contains a semi-permeable membrane which collects and removes traces of water which might remain as a haze in the oil. The oil reaching receiver 73 is essentially water-free and clear. The removed water leaves the separator through line 48 and is returned to the centrifuge. Water removed from the solids via the vibrating screen can also be added to the feed to the centrifuge via line 38 (or to the feed to filter 40 if there are any traces of solids in the water).

Water leaves the continuous centrifuge 42 via line 43 to a second Selas separator which has a semi-permeable membrane for removing traces of oil from water. The separated oil returns to the centrifuge via line 44 while the clear water continues on via line 50 to a water purification system. Here, water treating agent D from container 57 is added via metering pump 55 and feeder line 53 to the water entering static mixer 51 via line 59. Treating Agent D may be a polyvalent cationic material such as alum or ferric chloride, added in amounts of 0.01 to 0.2 percent on the water being treated. After mixing, a precipitating agent E from container 58 is added via metering pump 56 and feeder line 54 to line 60. The agent is added in stoichiometric quantity and is thoroughly mixed in static mixer 52. Agent E may be a solution of sodium hydroxide or of sodium carbonate, for example. The static mixers are of similar type to static mixer 10 described previously. A holding tank 61 is provided to allow sufficient time for the precipitated treating Agent D to flocculate, thereby removing impurities from the water stream. In special cases where it is desired to remove particular contaminants from the water, additional treating agents may be added, such as suitable small amounts of $H_2S$, $SO_2$ or activated carbon. The thus removed contaminants, incorporated in the precipitated flocculating agent, are now removed in filter 63, fed by line 62. The liquid is released through line 65 into clean water receiver 66. The filter may be a dual cartridge type filter or a rotary filter or a Kelly filter. It is desirable to keep the water system enclosed so as to conserve heat, since most of the water is recycled to heater 6 via line 69, pump 70 and line 71. Pump 70 should, of course, repressurize the water enough to enter heater 6.

Any chelated metals are present in the aqueous phase and can be precipitated in a later step using pH adjustment and precipitation.

Since water normally is contained in the sludge, there will usually be an excess of water entering receiver 66, so the excess is discharged through line 67. This water is clean enough to be used in the refinery, or be safely discharged into waterways.

For the purposes of the present invention any demulsifying agents known in the art may be used. Demulsifying agents may include oil soluble or water soluble surface active agents.

Among the preferentially oil soluble surface active agents are such sulfosuccinates such as sodium di(tridecyl)sulfosuccinate, sodium di(hexyl)-sulfosuccinate, di(sodium polyoxyethanol)-sulfosuccinate and the various grades of sodium di(2-ethylhexyl)sulfosuccinate. This last material is sold by American Cyanamid Company under the trademark Aerosol OT and is one of the first of the synthetic surface active agents. A pharmaceutical grade of sodium di(2-ethylhexyl)sulfosuccinate is available, and is used as a fecal softener, its toxicity is minimal. Other useful oil soluble surface active agents include, for example, sodium or calcium petroleum sulfonates, sulfonated or sulfated castor oil, sulfonated or sulfated tallow, sulfated or sulfonated oleic acid, and sulfonated or sulfated soybean oil.

Among the preferentially water soluble surface active agents are sodium isopropylnaphthalene sulfonate, other alkyl aryl sulfonates, e.g. sodium decylbenzene sulfonate, mixed octyldecylamine octyldecylguandine-polyoxyethanol, and others obtained under a wide variety of trade designations in the industry. These include sodium dodecylbenzene sulfonate, stearamidopropyl-dimethyl-$\beta$-hydroxyethyl ammonium nitrate, tall oil ethoxyethylate with from about 6 to 15 moles of ethylene oxide, sodium lauryl sulfate, sodium octadecyl sulfate, sodium alkyl sulfates from alpha olefins, or from oxoprocess alcohols. Nonyl phenol if ethoxylated with about 9.5 moles of ethylene oxide is both water and oil soluble, and by changing the degree of ethoxylation can be modified to either the oil or water side. These surfactants may include for example polyethylene oxide, polypropylene oxide and copolymers, phenol adducts thereof either random or block. These surfactants may also be functionalized with organic acids or esters for example ethyl acrylate, styrene sulfonate ester, etc.

For flocculants, high molecular weight materials such as polyacrylamides are preferred. One grade of polyacrylamide of about 15 million molecular weight and less than one percent hydrolysis is conveniently obtainable on the commercial market. Potable water grades are available. This product, with a low residual monomer content is acceptable for the treatment of drinking water. Other copolymers of acrylamide with acrylic acid, and aminated acrylates such as those derived from monomethyl amine-epichlorohydrin, quaternized monomethylamine-eipchlorohydrin, ethylene diamine dimethylamine-epichlorohydrin, dimethylamine reacted with polyacrylamide may be considered useful. A preferred polyacrylamide flocculating agent contains up to 20% by weight of a quaternized dimethylaminoethyl acrylate copolymerized with the polyacrylamide.

Other water soluble high molecular weight polymers are described in the patents above cited, particularly U.S. Pat. No. 3,480,761 and also U.S. Pat. No. 3,418,237 which are hereby incorporated in their entirety by reference and relied upon.

Surfactants may be added at any time before or during the mixing steps, however, it is preferred that surface active agents be added first and remain at a high temperature with mixing for a longer time.

More expensive less stable flocculating agents, e.g. polyacrylamides, may be added at a point in the process such that the residence time of the surfactant at the higher temperature is minimized.

The amount of flocculating agent or agents added will vary widely depending upon the agents themselves and the particular composition but will generally be an amount effective to form flocs of substantially all remaining solid particles of sizes of from about 20 microns to less than 2 microns in diameter. It is preferable that the amount of flocculating agent added be sufficient to form flocs that will be retained on a 200 mesh sieve (Tyler Sieve Series). Generally, from about 0.01 parts per million to about 1 weight percent based on the total weight of the fluid of one or more flocculating agents can be added. Dispersion of the polymers is preferably accomplished by the application of a dilute solution of the polymer to the fluid to be treated.

Some of the most effective flocculating agents for facilitating separation of solids from oils, water or oil-water mixtures are high molecular weight functional polymers such as polyacrylamide, certain polyacrylates and proteinlike materials. These compounds are, however, temperature sensitive, and tend to break down in molecular weight or lose effective functionality upon exposure to heat. However, the invention allows the beneficial effects of these desirable flocculants to be retained even while using them at high temperatures by limiting the time of exposure to a very short interval, between the time of mixing the subject emulsion with pressurized hot water to the time of expansion or "flashing" through a nozzle. This time may be as short as a few tenths of a second.

Thus the benefits of high temperature, say 110–170° C., such as low viscosity of the organic portion of the sludge, low surface tension, rapid contacting of materials and rapid chemical action, are achieved while retaining the physicochemical effectiveness of the flocculant.

The temperature drop during expansion can be over 100° C. under certain practical conditions. During the expansion, part of the water is vaporized, and under practical conditions the volume may increase many fold with only minor fraction of 1 to 10 percent vaporizing. The expansion, in addition to providing the desired cooling effect, also ensures that the solid "structure" surrounding each droplet of the emulsion is ruptured and destroyed, thus facilitating the three-phase separation which ensues rapidly following the expansion. The solids are first removed, as soon as possible, and then the oil-water separation can be made, no longer inhibited by the presence of solid "structures" around the droplets.

In accordance with the invention, the oil mixture may be treated with a metal complex-forming compound in the presence of a surfactant in order to isolate any heavy metals present in the oil mixture.

The complexing agents used are aqueous solutions of inorganic or organic acids, as described in, for example British Patent No. 1,329,174 as well as polycarboxylic acids and/or polyaminocarboxylic acids (cf. U.S. Pat. No. 3,838,102 or other chelating agents, such as nitrilotriacetic acid and its sodium salts or ethylenediaminetetraacetic acid and its sodium salts (Na3-EDTA)(cf. U.S. Pat. No. 3,951,917), the latter also in combination with quaternary ammonium salts (U.S. Pat. No. 4,026,870), such as complex-forming agents from the group comprising the bisguanides (cf. U.S. Pat. No. 4,097,458) and other complexforming compounds, and the entire disclosures of all of the above-mentioned patents are hereby incorporated by reference and relied upon. Other chelating agents include citric acid, glycolic acid, phosphoric acid derivatives, phthalodinitrile and the like.

The complex-forming agent is preferably present in an amount of from 0.5 to 5 moles per mole of metal ion in the oil.

Generally, concentrations from about 30 to about 10,000 parts per million are preferred.

Suitable mixers include, for example, static mixers of the orifice-pipe type, high shear rotating plate types, interrupted helix types or merely a stirred tank.

Filters may be used to clean the initial feed stream or at any point throughout the process. The filters used may be any of those known in the art for example screen or grid type filters which may be self-cleaning or periodically purged, or leaf filters or drum filters.

Process hot water and steam may be supplied by, for example, a gas fired boiler. Preheating the waste oil may be necessary for very high viscosity sludges. Preheating the waste oil may be accomplished by any heating means known in the art. The waste oil may be preheated using a steam coil, an electrically heated coil, direct addition of steam, addition of microwave energy infrared energy or any other convenient means. The waste oil can be filtered or strained to remove debris and large sediment, prior to the actual treating process described above.

The cooling means can be any convenient means known in the art, for example, heat exchange with the cooler feed stream or cold water or air or by the addition of cold water to the stream. A preferred cooling means may involve flashing the high pressure, high temperature mixture into a lower pressure vessel through an orifice or venturi. By using a flashing step the mixture can be cooled 50° C. to 100° C. almost instantaneously.

During the flashing step, for example, the volume of the mixture can be increased tenfold with a corresponding evaporation of about 3 percent of the aqueous phase and a decrease in temperature of about 60° C.

Immediately after the cooling or flashing step the solids must be removed from the mixture to prevent them from re-establishing the suspension matrix.

Solids derived from the process may be washed with hot water or steam.

Separation of the flocculated mixture can be achieved by passage through a centrifuge. Conveniently the solids are separated first, then the two liquid phases are separated in a subsequent stage.

The organic phase may be further cleaned by further centrifugation or filtering or by using a SELAS type liquid separator.

Additional chemical agents, for example, chelating agents, may be added immediately upstream from the cooling or flashing step.

EXAMPLES

To illustrate the present invention, the following illustrative embodiments are given. It is to be understood, however, that the embodiments are given for the purpose of illustration only and that the invention is not to be regarded as limited to any of the specific materials or conditions used in the specific embodiments.

For purposes of convenience, unless otherwise clearly set forth, percentages are given in this specification by weight, but may be volume ratios or percentages where other methods of reporting are preferred.

EXAMPLE 1

200 grams of sludge containing 70 weight percent crude oil of specific gravity 0.875 (30 API gravity), 22 percent water and 8 percent of a fine siliceous sand (specific gravity 2.20) was preheated to 70° C. (158° F.) and stirred until uniform. This mixture was then transferred to an autoclave provided with internal baffles and the air above it displaced with steam. Then 180 grams of water from a boiler heated to 170° C. at its autogenous pressure (about 790 kilopascals absolute) was pumped into the autoclave, and the autoclave then rotated at 10 RPM to mix the contents. 500 mg of an anionic wetting agent ,Dove TM, was then pumped in and the autoclaved rotated at 10 RPM for 3 minutes. Next there was added, under pressure, 50 mg of a high molecular weight (2 million) polyacrylamide containing about 20 percent of quaternized dimethylaminoethyl acrylate copolymerized therewith. This additive was then mixed in by rotating the autoclave for another 3 minutes.

The autoclave was then vented to release steam pressure, and the liquid contents blown out to a receiver through a 200 mesh stainless steel filter screen mounted separately from the receiver. The filter was flushed with hot water, then opened and the screen removed. The screen was found to have collected 15.8 grams of essentially clean siliceous sand (after drying).

The liquid in the receiver was promptly centrifuged in a heated centrifuge to separate oil and water layers. The centrifugation product was found to be two distinct layers, the upper layer containing 139.5 grams of 30° C. API gravity oil. It was slightly cloudy, but upon passing through a SELAS TM separator was clear and free of droplets. A SELAS separator is a commercial semipermeable membrane device for removing small traces of water from oil, or of oil from water.

The water layer from the centrifuge, amounting to 190 grams, was likewise passed through another Selas separator and emerged clear, only traces of oil being removed in the separator. Alternatively, it was found that bright and clear water product could be obtained by conventional alum-soda ash treatment.

The water evaporated as steam amounted to about 30 grams.

EXAMPLE 2

200 grams of a sludge comprising 68 weight percent of a crude oil of specific gravity 0.880 (29° API), 23.5 weight percent water and 8.5 percent of a clay-sand mixture. The solids were of specific gravity 2.15, and contained about 50 percent clay.

The sludge was preheated as in Example 1 to about 70° C. and then blended with 160 grams of water preheated to 170° C. in an autoclave, as in Example 1.

750 mg of TRITON X-100 wetting agent and 75 mg of CYFLOC 4500 were added and blended as above.

After blending, the autoclave was carefully vented from the vapor space and the liquid-solid mixture then discharged through a filter screen of 240 mesh size. The solids were washed with boiling water, the washings being added to the filtrate. The solids collected on the screen were dried and weighed and found to be 16.5 grams, substantially oil-free.

The filtrate was promptly centrifuged to yield two distinct layers, an upper oil layer of 135.6 grams, only slightly cloudy, and a lower water layer of 192 grams, containing a slight haze of mud and oil.

The water layer, after agitation with 5 grams of alum and 2.5 grams of sodium carbonate, each dissolved in a minimum amount of water, allowing 10 minutes settling time, was filtered through filter paper. The effluent water was clear and free of oil.

The oil layer was passed through a water-repellant membrane filter of the SELAS Separator type, and emerged free of water or solids.

The venting of steam from the autoclave accounted for the remainder of the water, and removed traces of volatile sulfur compounds from the oil.

EXAMPLE 3

1500 grams per hour of the heated and stirred sludge of Example 2 is fed by means of a progressive cavity pump ("MOYNO" type) to a continuous mixing line of three half-inch diameter static mixers in series ("KENICS" type). The stream of sludge was joined by a stream of water under a pressure of 900 kilopascals absolute (116 psi gauge) and about 175° C. flowing at a rate of 1400 grams per hour. Into the combined stream after the first mixer, there was injected 50 grams per hour of a 10 percent solution of WISK TM liquid detergent (a commercial combination of anionic and nonionic surfactants) in water. After the second mixer, there was added a stream of 5 grams per hour of a 3 percent solution of HERCOFLOC 863, a modified polyacrylamide. After the third mixer, a stream of 5 grams per hour of a 10 percent solution of EDTA in water was injected as the main stream entered a nozzle from which the combined liquids emerged tangentially into a 5 liter conical chamber. The chamber was maintained at a pressure of about 150 kilopascals absolute by venting vapors through a pressure control valve. The vapors were found to be mostly steam, with small amounts of $H_2S$ and hydrocarbons. The liquid collecting in the bottom of the chamber was allowed to discharge through a fine screen to remove solids, and passed at atmospheric pressure into a continuous vertical centrifuge to separate an oil phase from a water phase. Traces of solids were also discharged from the continuous centrifuge by means of a small helical conveying device at the bottom. The centrifuge was operated at a speed of rotation to give a force of approximately 2000 times gravity.

It was found that about 8 percent of the added hot water was vaporized as steam, the rest remaining with the water recovered. 99.5 percent of the oil in the sludge was recovered from the centrifuge, the remainder adhering to the solids, appearing as vapor with the steam or suspended in the water as haze. The solids could be readily washed free of oil by rinsing with a small amount of detergent in warm water. (This could be the detergent solution injected into the sludge-water stream at the mixing step.) The oil haze in the water could readily be removed by a conventional water treatment procedure. (Addition of ferric chloride followed by caustic soda and filtration.)

Removal of heavy metal by the treating procedure was also evaluated.

It was found that the initial sludge contained 600 ppm of vanadium metal (mostly held in the oil phase as organic adducts). The recovered oil, after centrifuging, contained only 9 ppm of vanadium, the rest having gone into the water phase with the EDTA.

The recovered water, upon treatment with ferric chloride and sodium hydroxide, was filtered; most of the vanadium was found in the filter cake; and the water thus purified contained only 2 ppm of vanadium.

Other modifications and variations of the present invention are possible in light of the above teachings. It is, therefore, to be understood that changes may be made in the particular embodiments described above which are within the full intended scope of the invention as defined in the appended claims.

What is claimed is:

1. A method for continuously separating oil, water and solids from stable mixtures thereof comprising the steps of:
   heating under an absolute pressure of at least about 1.5 atm a mixture comprising liquids and solids to a temperature of at least about 115° C., said liquids comprising oil and water;
   cooling said heated mixture to below about 100° C. by flashing said heated mixture into a lower pressure;
   separating the solids from the liquids in said mixture; and
   separating the water from the oil.

2. The method of claim 1 further comprising the step of adding a flocculating agent prior to said cooling step.

3. The method of claim 2 wherein said flocculating agent is added to said mixture no more than about 5 minutes prior to said cooling step.

4. The method of said claim 2 wherein said flocculating agent is added to said mixture no more than about 1 minute prior to said cooling step.

5. The method of claim 2 wherein said flocculating agent comprises a polyacrylamide.

6. The method of claim 5 wherein said flocculating agent further comprises up to 20% by weight of a quaternized dimethylaminoethyl acrylate copolymerized with said polyacrylamide.

7. The method of claim 2 wherein said flocculating agent is added in the amount of 5 ppm to 1000 ppm by weight.

8. The method of claim 2 wherein said flocculating agent is added in the amount of 50 ppm to 100 ppm by weight.

9. The method of claim 2 wherein said flocculating agent is added at the throat of a Venturi expansion jet.

10. The method of claim 1 further comprising the step of adding a demulsifying agent to said mixture.

11. The method of claim 10 wherein said demulsifying agent comprises a detergent.

12. The method of claim 10 wherein said demulsifying agent comprises a polyethylene oxide alkyl phenol.

13. The method of claim 10 wherein said demulsifying agent is added in the amount of 5 ppm to 1000 ppm by weight.

14. The method of claim 10 wherein said demulsifying agent is added in the amount of 50 ppm to 100 ppm by weight.

15. The method of claim 1 further comprising the steps of adding a flocculating agent to said mixture and adding a demulsifying agent to said mixture.

16. The method of claim 15 wherein said flocculating agent and said demulsifying agent are added to said mixture substantially simultaneously.

17. The method of claim 1 further comprising the step of adding a complexing agent to said mixture.

18. The method of claim 17 wherein said complexing agent comprises a chelating agent selected from the group consisting of citric acid, glycolic acid and EDTA.

19. The method of claim 17 wherein said complexing agent is added in the amount of 50 to 500 ppm by weight.

20. The method of claim 1 further comprising the step of agitating said mixture.

21. The method of claim 1 wherein said heated mixture is flashed into a pressure of 0.3 to 0.6 atmospheres gauge.

22. The method of claim 1 wherein said cooling step comprises suddenly releasing the pressure exerted on said heated mixture by passing said heated mixture through a Venturi expansion jet.

23. The method of claim 1 wherein said cooling step comprises cooling said heated mixture to below 90° C. within about 1 to 2 seconds.

24. The method of claim 1 further comprising the step of recycling water and heat from the water separation step for use in said heating step.

25. The method of claim 1 wherein the heating step comprises rapidly mixing said mixture under pressure with pressurized hot water so that said liquids are at a temperature of at least about 115° C.

26. The method of claim 1 wherein the heating step comprises rapidly mixing said mixture under pressure with pressurized hot water and steam so that said liquids are heated to a temperature of at least about 115° C.

27. The method of claim 1 wherein the heating step comprises rapidly mixing said mixture under pressure with pressurized steam so that said liquids are heated to a temperature of at least about 115° C.

28. The method of claim 1 wherein the heating step comprises rapidly mixing the mixture under pressure with pressurized hot water and steam so that said liquids are at a temperature above 170° C.

29. The method of claim 1 wherein the mixture and the liquid are pressurized to an absolute pressure of at least about 8 atmospheres.

30. The method of claim 1 further comprising the step of separating solids which settle out from said mixture prior to heating said mixture.

31. An apparatus for continuously separating oil, water and solids from stable mixtures thereof comprising:
   means for heating under a pressure of at least 1.5 atm, a mixture comprising oil, water and solids to a temperature of at least about 115° C.;
   means for rapidly cooling the heated mixture to below about 100° C., said cooling means comprising means for flashing the heated mixture into a lower pressure;
   means for separating the solids from the oil and water in said mixture; and
   means for separating the water from the oil.

32. The apparatus of claim 31 further comprising means for adding flocculating agent to said heated mixture.

33. The apparatus of claim 31 further comprising means for agitating said mixture.

34. The apparatus of claim 31 comprising means for adding a demulsifying agent to said mixture.

35. The apparatus of claim 31 further comprising a means for adding a complexing agent to said mixture.

36. The apparatus of claim 31 wherein said cooling means comprises a Venturi expansion jet.

37. The apparatus of claim 31 further comprising means for recycling water and heat from the water separation means for use in said mixture heating means.

38. The apparatus of claim 31 wherein said means for separating the solids from the oil and water in said mixture comprises a hydrocyclone separator.

39. The apparatus of claim 31 wherein the means for separating the water from the oil comprises a centrifuge.

40. The apparatus of claim 31 wherein said heating means comprises a means for pressurizing the mixture, a mixer and a source of hot pressurized water.

41. The apparatus of claim 31 wherein said heating means comprises a means for pressurizing the mixture, a mixer and a source of hot pressurized steam.

* * * * *

UNITED STATES PATENT AND TRADEMARK OFFICE
CERTIFICATE OF CORRECTION

PATENT NO. : 4,938,876
DATED : July 3, 1990
INVENTOR(S) : Ernest O. Ohsol

It is certified that error appears in the above-indentified patent and that said Letters Patent is hereby corrected as shown below:

In column 13, line 10, change "1.5" to -- 1.7 --.

Signed and Sealed this

Thirtieth Day of December, 1997

Attest:

BRUCE LEHMAN

Attesting Officer

Commissioner of Patents and Trademarks